United States Patent
Kandepalli Cherukuru et al.

(10) Patent No.: US 10,609,239 B1
(45) Date of Patent: Mar. 31, 2020

(54) SYSTEM AND METHOD FOR MACHINE LEARNING BASED RESTRICTIVE DEVICE OPERATION

(71) Applicant: Toshiba TEC Kabushiki Kaisha, Shinagawa-ku (JP)

(72) Inventors: Sai Geetha Kandepalli Cherukuru, Irvine, CA (US); Hoang Bao, Rosemead, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/171,460

(22) Filed: Oct. 26, 2018

(51) Int. Cl.
| | |
|---|---|
| *G06F 3/12* | (2006.01) |
| *H04N 1/00* | (2006.01) |
| *H04N 1/44* | (2006.01) |
| *G06F 9/50* | (2006.01) |
| *G06N 5/02* | (2006.01) |

(52) U.S. Cl.
CPC ..... *H04N 1/00843* (2013.01); *H04N 1/00854* (2013.01); *H04N 1/00875* (2013.01); *H04N 1/444* (2013.01); *G06F 9/50* (2013.01); *G06N 5/025* (2013.01); *H04N 2201/0094* (2013.01)

(58) Field of Classification Search
CPC ........... H04N 1/00843; H04N 1/00854; H04N 1/00875; H04N 1/444; H04N 2201/0094; G06F 9/50; G06N 5/025
USPC .......... 358/1.1–1.18, 402, 474, 3.28
See application file for complete search history.

(56) References Cited

U.S. PATENT DOCUMENTS

| | | | |
|---|---|---|---|
| 7,369,279 B2 | 5/2008 | Van Oosterhout | |
| 8,437,049 B2 | 5/2013 | Kakutani | |
| 8,953,189 B1 | 2/2015 | Agrawal et al. | |
| 9,691,027 B1 | 6/2017 | Sawant et al. | |
| 2006/0001899 A1* | 1/2006 | Kanno | G06F 21/604 358/1.14 |
| 2010/0058077 A1* | 3/2010 | Matsuda | G06F 21/78 713/194 |
| 2014/0304197 A1* | 10/2014 | Jaiswal | G06F 21/6209 706/12 |
| 2017/0039326 A1* | 2/2017 | Stankiewicz | G06Q 10/063 |
| 2018/0288280 A1* | 10/2018 | Bermundo | H04N 1/4446 |
| 2018/0349388 A1* | 12/2018 | Skiles | G06F 3/0482 |

* cited by examiner

*Primary Examiner* — Gabriel I Garcia
(74) *Attorney, Agent, or Firm* — Ulmer & Berne LLP

(57) ABSTRACT

A multifunction peripheral includes a processor and a memory storing boundary data defining a boundary between allowable and prohibited document processing jobs. The processor receives a document processing job and analyzes it relative to boundary data stored in the memory. The processor selectively performs the document processing job in accordance with analysis of the received document processing job relative to the boundary data. The boundary data defines what is acceptable or unacceptable for a document processing operation. The boundary data is determined via machine learning applied to analysis of document content, document metadata, rules or policies.

16 Claims, 4 Drawing Sheets

SYSTEM AND METHOD FOR MACHINE LEARNING BASED RESTRICTIVE DEVICE OPERATION

TECHNICAL FIELD

This application relates generally to enabling or disabling document processing operations. The application relates more particularly to use of machine learning to disable requested document processing operations by weighing a request relative to legal, policy, temporal or situational inputs.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used. Given the expense in obtaining and maintain MFPs, devices are frequently shared or monitored by users via a data network.

MFPs are used, among other things, for copying tangible documents, scanning tangible documents into electronic form, generating tangible document from electronic documents or sending or storing electronic documents. There may be some users who use an MFP in ways that are against business policy, or even illegal. For example, a user may try to printout confidential document or copy copyrighted material. A user may also use and MFP for personal reasons, resulting in machine unavailability, unnecessary wear and tear and unnecessary use of consumables. If a user uses an MFP for unlawful means, such as by copying copyrighted materials, their employer may be liable for civil or criminal remedies.

BRIEF DESCRIPTION OF THE DRAWINGS

Various embodiments will become better understood with regard to the following description, appended claims and accompanying drawings wherein:

DETAILED DESCRIPTION

Figure 1:
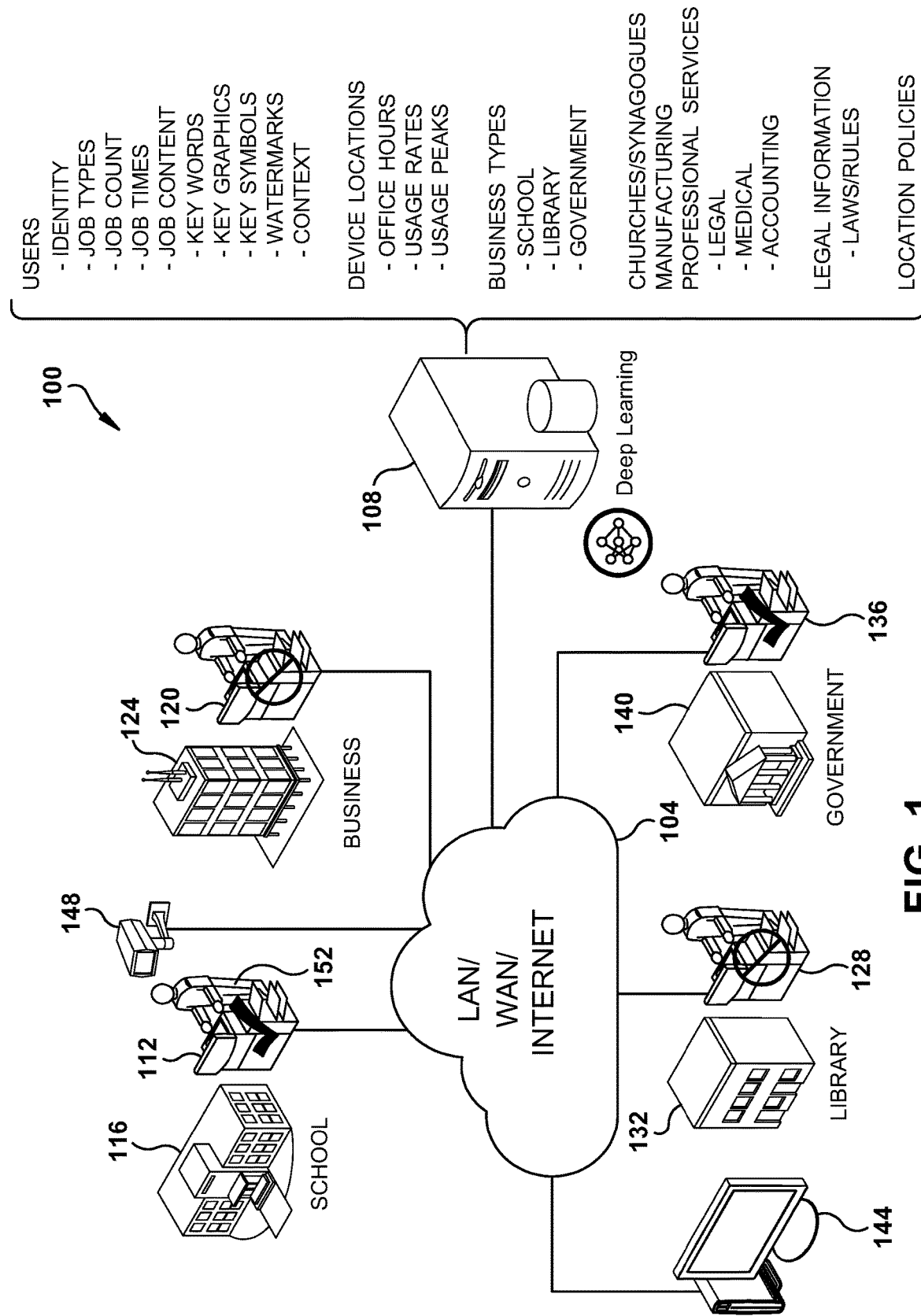
FIG. 1 is an example embodiment of a document processing operation control system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In an example embodiment detailed herein, a multifunction peripheral includes a processor and a memory storing boundary data defining a boundary between allowable and prohibited document processing jobs. The processor receives a document processing job and analyzes it relative to boundary data stored in the memory. The processor selectively performs the document processing job in accordance with analysis of the received document processing job relative to the boundary data.

In a further example embodiments detailed below, a system of machine learning, such as supervised or unsupervised learning, is used to analyze multiple document inputs, including character or image recognition, to facilitate classification of types of documents that are currently being processed. This data can then be used to restrict MFP usage based on parameters set by an administrator. Such control is advantageously used by an administrator or organization that controls and owns the MFP in order to restrict document job processing, as well as to gather information to determine categorization of document job patterns.

In a particular example, an MFP may be used in an educational institution setting. Typically, schools and universities would want to restrict students from printing or copying copyrighted materials such as textbooks. As detailed below, an MFP can be taught to recognize a textbook and prevent operations such as copying large portions of textbook or printing an e-book.

In another example, an MFP is used in a corporate setting. Companies may have policies around handling confidential information. To enforce this, embodiments disclosed herein provide that an MFP can learn to recognize documents that contain sensitive data or watermarked as confidential and prevent copying or other operations as defined by an administrator. Certain patterns or watermarks may have been intentionally place in a tangible document, such as a "Eurion" constellation that can appear on a banknote, which constellation is recognizable by a copier and, once recognized, can disable the copier from reproducing the banknote. In other instances, however, an issue of likely copyright infringement can be made by prior machine learning associated with document size or content.

In example embodiment herein, a document is fed through an MFP, and it is processed using machine learning techniques to determine whether the document is restricted relative to document processing operations in a given environment. If so, the MFP is prevented from performing any such operation. Additionally, notification of such usage can be sent to the MFP owner.

A MFP is provided with training data that will help it to classify if input contains restricted data. For security reasons, if the document contains restricted data, then the print, copy, or scan operations will be blocked. Once the job is evaluated, the hardware imprint and metadata are scrubbed to ensure privacy/security and the scrubbed data is sent to a cloud server for added input relative to generating restrictions for future device operations. MFP analytics thereby suitably supplemented with evaluation data.

In accordance with the subject application, FIG. 1 illustrates an example embodiment of a document processing operation control system 100. A plurality of MFPs are connected via network cloud to a network or cloud server 108. Network 104 is comprised of a local area network (LAN) a wide area network (WAN) which may include the Internet, or any suitable combination thereof. In the illustrated example, MFP 112 is associated with school 116, MFP 120 is associated with business 124, MFP 128 is associated with library 132 and MFP 136 is associated with government office 140. MFPs may be subject to different constraints for different businesses. For example, a non-profit use of a small portion of a copyrighted work in connection with an educational use, such as with school 116, may be deemed permissible as "fair use" of copyrighted materials under United States Federal law. However, use of even a small portion of a copyrighted work for profitmaking reasons of business 124 may not be considered as fair use. Thus, business 124 may be under different constraints than school 116 relative to document copying or reproduction. An MFP may be associated with a particular institution that places its own constraints on device operations, such as limiting copying of certain content, deemed less essential, to times when a device is typically in a low usage period. Copying of financial data, such as payroll records, may be limited to certain individuals or certain devices, such as devices located in a business's accounting department.

In the example embodiment of FIG. 1, MFPs 112 and 136 are approved to complete requested document processing operations, while MFPs 120 and 128 are not and the requested operation is aborted. When a document processing operation is requested, it is suitably identified relative to its device, device location, requesting user and document content. Personally identifiable information is suitably scrubbed, and the document or document summary, along with document metadata, is communicated to cloud server 108 via network cloud 104. Cloud server 108 suitably accumulates such data from multiple MFPs, such as those illustrated in FIG. 1. Cloud server 108 uses machine learning to determine boundaries of legitimate or acceptable document processing operations from received data, and data allowing each particular MFP to determine acceptable operations for it is then communicated to each MFP. Machine learning is performed using either unsupervised learning, or supervised learning such as via an administrator operating via workstation 144. Additional inputs are suitably used to determine acceptability of a document processing operation, such as user permissions, user histories, time of day, business type, MFP loading or MFP features. Legal constraints or company policy constraints, among other inputs, are suitably used for improved determining of permissive use boundaries. Users of MFPs are suitably identified by device login, or by biometric recognition such as via digital camera 148 directed to device user 152. Camera 148 is also suitably used to determine if others are waiting behind user 152, providing for feedback that certain device operations may be advantageously restricted, such as jobs that will require substantial device time to process. Camera 148 is also suitably proximate to an open MFP device to see who is physically performing what type of job on the MFP.

Figure 2:
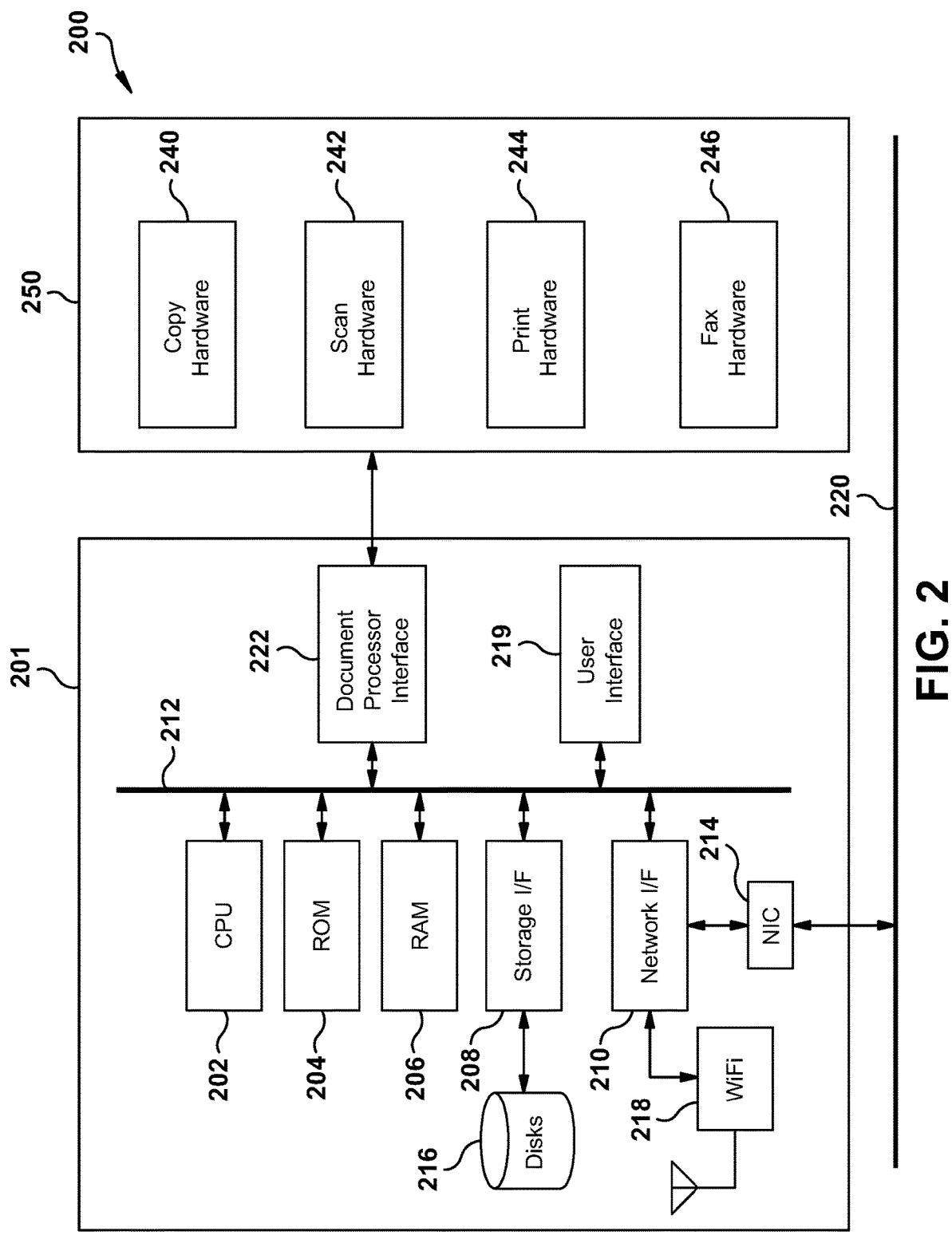
FIG. 2 is an example embodiment of a multifunction peripheral.

Turning now to FIG. 2 illustrated is an example embodiment of a MFP device comprised of a document rendering system 200 suitably comprised within an MFP, such as with MFPs 112, 120, 128 and 136 of FIG. 1. Included in intelligent controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with one or more sensors which provide data relative to a state of the device or associated surroundings, such as device temperature, ambient temperature, humidity, device movement and the like.

Processor 202 can also be in data communication with any suitable user input/output (I/O) interface 219 which provides data communication with user peripherals, such as displays, keyboards, mice, track balls, touch screens, or the like. Hardware monitors suitably provides device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Intelligent controller 201 is suitably provided with an embedded web server system for device configuration and administration. A suitable web interface is comprised of TOPACCESS Controller (sometimes referred to in the subject illustrations as "TA"), available from Toshiba TEC Corporation.

In certain embodiments, machine learning is introduced into an MFP to recognize restricted documents as defined by an administrator. A supervised learning algorithm would allow the administrator to feed the MFP with an initial training dataset that would allow the printer to define a restriction policy. This can then be used to identify user input that is of a restricted nature. For restricted documents, any operation on MFP may be blocked. Documents evaluated to be unrestricted will be processed (print/scan/copy) normally.

Every document that is fed into the MFP is processed by the intelligent classification algorithm and then scrubbed of any personally identifiable information, before being aggregated to the training data in the cloud. Commonly defined policies can be stored in the cloud for common access across customers. Metadata aggregated from the process can be used to supplement MFP analytics.

With example embodiments disclosed herein, printer and printed data analytics provide insights such as identifying users who use MFP excessively, identifying users using the MFP during out of office hours or identifying the printing peaks so as to plan for utilizing device resources effectively.

In an example embodiment, the forgoing is achieved by a supervised machine learning system. A particular example includes use of a support vector machine (SVM), which is a supervised machine-learning method that is very powerful to distinguish binary classifications, such as in this example, restricted or unrestricted documents. An SVM system utilizes sample data to identify what is a restricted document, whether it is by its text, images, shapes, watermarks or patterns. Once all the data of what is considered restricted for a specific MFP is added, machine learning is performed.

The SVM system basically relies on determining a boundary on one classification, such as by determining where a boundary lies for restricted documents. Once that boundary is determined, any new points that are not considered as a restricted document are suitably classified as unrestricted document, being outside the boundary.

Figure 3:
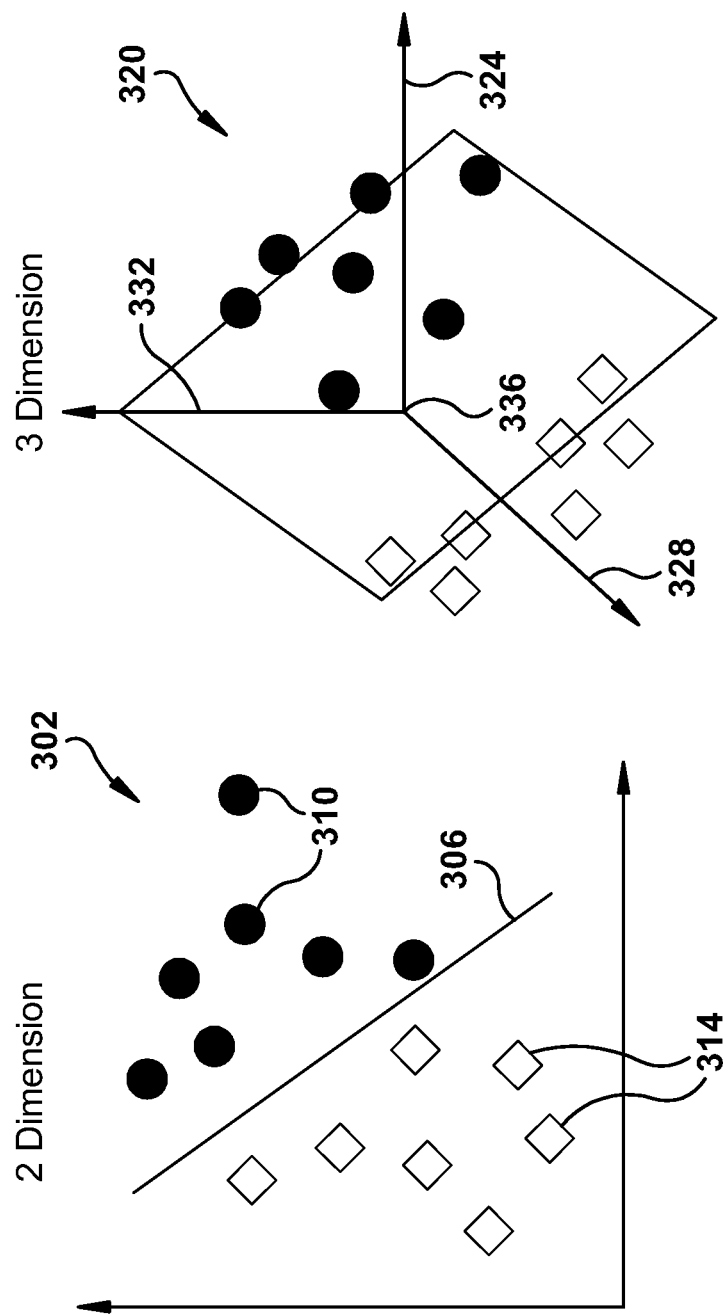
FIG. 3 is an example embodiment of boundaries defining acceptability of requested document processing operations.

A benefit of if the SVM system is that a boundary can be as specific or as general as the user wants to define it to be. A boundary can be as general as a line in two-dimensional space; only categorizing documents with only certain text as restricted, as an example. Referring to FIG. 3, two-dimensional space 302 includes boundary 306 that separates a first class of data points, such as data points for acceptable operation at set 310 from other data points, such as data points for unacceptable operation set 314. Alternatively, a boundary can be more complex in a hyper-plane space, such as a three-dimensional or great space, categorizing documents with a combination of text, image variations, shapes, frequencies, and patterns as restricted. In FIG. 3, example three-dimensional space 320 includes boundaries 324, 328 and 332, conjoined at a common intersection point 336. Within such a model, data points that are furthest from any defined boundary are considered to be more likely to be within their classification.

Another example machine learning system comprises a Naïve Bayes classifier is a supervised learning classifier that handles classification from an existing dataset, with a given set of features, using probability. Such a system utilizes pre-categorized data with identifiable features to determine whether a document is restricted or unrestricted. For example, some features can include illegal text phrases, images, image placement, patterns, shapes, and even text frequency.

From an existing data set having identifiable features, as a new data case arrives, its classification is assessed based on a prior probability from the existing dataset. In a particular example, a user would be a user trying to copy a document that contains a popular piece of copyrighted artwork with a disclaimer on the bottom that states, "© Not to be reproduced." When document content is put through the Naïve Bayes classifier model noted above, an existing dataset is suitably used to determine if existing features of restricted text or restricted images. From this information and any feature identified, a document is suitably classified with a probability that is document is more likely to be restricted or unrestricted, and then categorize it as such.

A benefit of using Naïve Bayes classification is that it can be independent and desensitized relative to irrelevant features. The presence or absence of another feature does affect other features. This suitably allows a document to be categorized as restricted or unrestricted immediately once one feature is categorized.

Given the nature of device operation control as noted above, it may be advantageous to notify users before any operation is performed on the MFP, and require the user to accept a 'terms and conditions' for usage. With this, each user can understand why a particular requested operation is not completed. Additionally, such notification may dissuade device usage misconduct. A user will understand their responsibilities for their requested usage. They may also understand consequences when supervisors are notified about attempted, unacceptable device operation requests.

User identification is suitably accomplished by requiring users to provide credentials in order to access the MFP. This can further limit handling. Metadata from classification operation is suitably fed back into MFP to enrich a training data repository.

Figure 4:
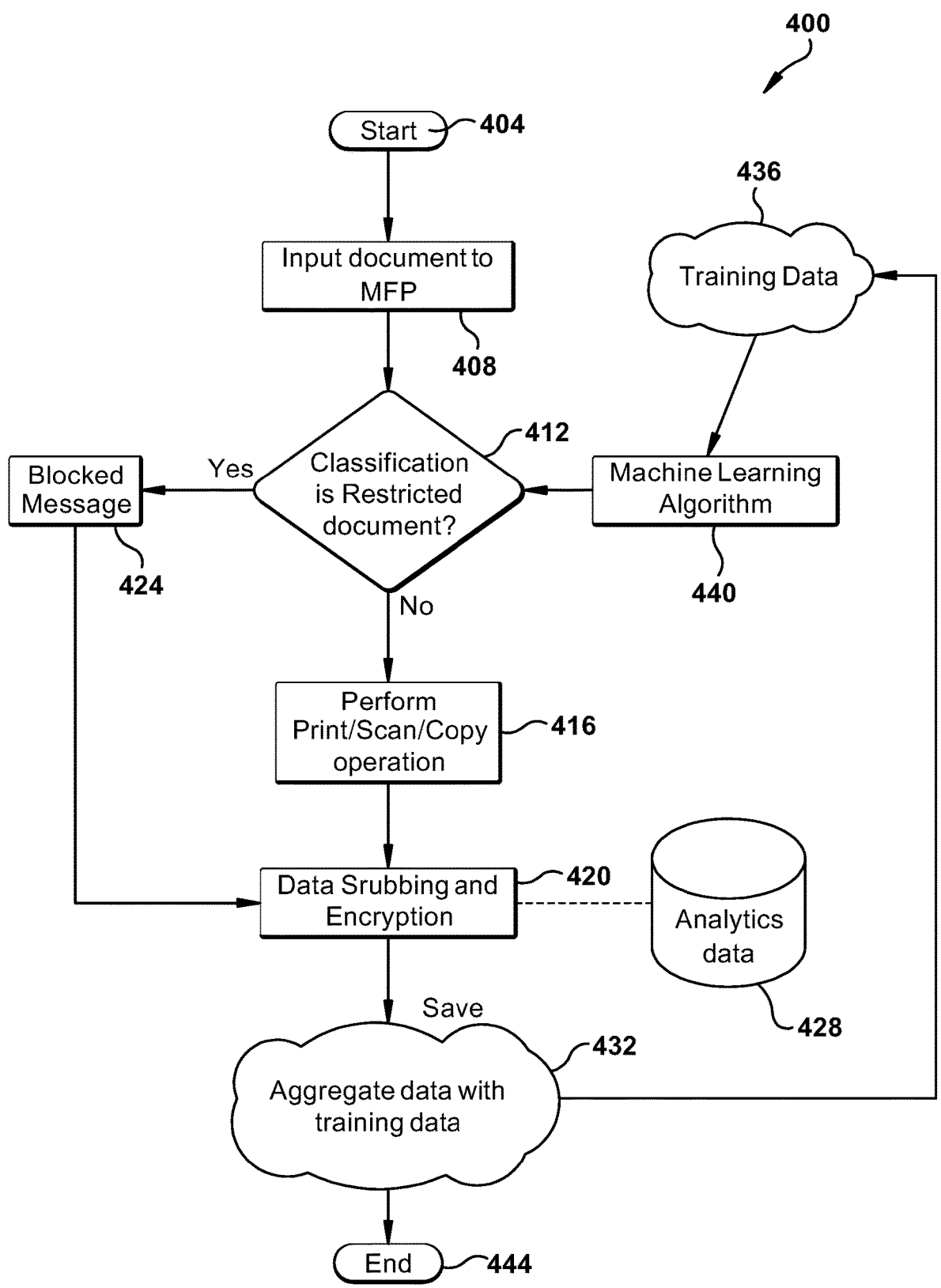
FIG. 4 is a flowchart of an example embodiment of a control of multifunction peripheral operations from document classification and applied machine learning.

FIG. 4 illustrates a flowchart 400 of an example embodiment of control of MFP operations using document classification and applied machine learning. The process commences at block 404 and continues to block 408 when a user inputs a document, electronic or tangible, into an MFP along with a document processing action request. A determination is made at block 412 as to whether the document is classified as restricted. If not, the requested action, such as print, scan or copy, is performed at block 416. Next, selected data, such as personally identifiable content, is scrubbed at block 420. If a determination is made at block 412 that the document is classified as restricted, then at block 424 the user receives a message and performance of the requested operation is blocked, such as by disabling or voiding the corresponding MFP functionality, after which the process proceeds to block 420 for scrubbing. At block 420, analytics data from the document is added to storage 428. The analytics data is aggregated with training data from other document processing requests at block 432. The resultant aggregated data is provided as training data 436 to a machine learning algorithm 440 which is used in conjunction with the determination made at block 412 as noted above. The process then suitably ends at block 444, recommencing when another document processing operation is requested.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
a processor;
a memory storing boundary data defining a boundary between allowable and prohibited document processing jobs, the boundary data corresponding to a support vector machine classifying the allowable and prohibited document processing jobs in accordance with supervised learning;
a network interface;
a print engine operable in connection with instructions received from the processor; and
a scan engine operable in connection with instructions received from the processor,
wherein the processor is configured to receive a document processing job,
wherein the processor is further configured to analyze a received document processing job relative to the boundary data,
wherein the processor is further configured to selectively perform the document processing job in accordance with analysis of the received document processing job relative to the boundary data,
wherein the processor is further configured to analyze content of an electronic document associated with the document processing job relative to the boundary data to selectively perform the document processing job, wherein the processor is further configured to scrub personally identifiable information from the electronic document, wherein the processor is further configured to communicate a scrubbed electronic document to an associated server via the network interface, wherein the processor is further configured to receive updated boundary data from the associated server wherein the updated boundary data includes data associated with the scrubbed electronic document, and wherein the processor is further configured to replace the boundary data with the updated boundary data.

2. The multifunction peripheral of claim 1 wherein the processor is further configured to analyze metadata associated with the electronic document relative to the boundary data to selectively perform the document processing job.

3. The multifunction peripheral of claim 2 wherein the metadata includes an identity of a user requesting the document processing job.

4. The multifunction peripheral of claim 2 wherein the metadata includes data defining legality of the document processing job on the electronic document.

5. The multifunction peripheral of claim 1 wherein the processor is further configured to
communicate operational data corresponding to operation of the multifunction peripheral to the associated server,
receive updated boundary data from the associated server wherein the updated boundary data includes data associated with the operational data, and
replace the boundary data with the updated boundary data.

6. The multifunction peripheral of claim 5 wherein the operational data includes one or more of device counter data, business type for users of the multifunction peripheral, or device usage data corresponding to usage of the multifunction peripheral by a user submitting the document processing job.

7. A method comprising:
storing, in a memory, boundary data defining a boundary between allowable and prohibited document processing jobs, the boundary data corresponding to a support vector machine classifying the allowable and prohibited document processing jobs in accordance with supervised learning;
controlling a print engine with instructions received from a processor;
controlling a scan engine with instructions received from the processor;
receiving a document processing job;
analyzing a received document processing job relative to the boundary data; and
selectively performing the document processing job in accordance with analysis of the received document processing job relative to the boundary data;
analyzing content of an electronic document associated with the document processing job relative to the boundary data to selectively perform the document processing job,
scrubbing personally identifiable information from the electronic document,
communicating a scrubbed electronic document to an associated server via the network interface,
receiving updated boundary data from the associated server wherein the updated boundary data includes data associated with the scrubbed electronic document, and
replacing the boundary data with the updated boundary data.

8. The method of claim 7 further comprising analyzing metadata associated with the electronic document relative to the boundary data to selectively perform the document processing job.

9. The method of claim 8 wherein the metadata includes an identity of a user requesting the document processing job.

10. The method of claim 8 wherein the metadata includes data defining legality of the document processing job on the electronic document.

11. The method of claim 7 further comprising:
communicating operational data corresponding to operation of the multifunction peripheral to the associated server,
receiving updated boundary data from the associated server wherein the updated boundary data includes data associated with the operational data, and
replacing the boundary data with the updated boundary data.

12. The method of claim 11 wherein the operational data includes one or more of device counter data, business type for users of the multifunction peripheral, or device usage data corresponding to usage of the multifunction peripheral by a user submitting the document processing job.

13. A system comprising:
a processor;
a memory; and
a network interface configured to receive, into the memory, electronic documents scrubbed of personally identifiable information from a plurality of multifunction peripherals,
wherein the network interface is further configured to receive, into the memory, document processing job data corresponding to a document processing job request for each of the electronic documents,
wherein the network interface is further configured to receive, into the memory, metadata corresponding to each electronic document,
wherein the memory is configured to store storing business type data corresponding to a business type associated with each of the electronic documents,
wherein the further storing rule data defining appropriateness of each document processing job on its associated electronic document,
wherein the processor is configured to perform machine learning on the electronic documents, the metadata, the business type data and the rule data to generate boundary data defining a boundary between allowable and prohibited document processing jobs, the boundary data corresponding to a support vector machine classifying the allowable and prohibited document processing jobs in accordance with supervised learning,
wherein the processor is further configured to communicate the boundary data to the multifunction peripherals via the network interface,
wherein the processor is further configured to scrub personally identifiable information from the electronic documents,
wherein the processor is further configured to communicate scrubbed electronic documents to an associated server via the network interface,
wherein the processor is further configured to receive updated boundary data from the associated server wherein the updated boundary data includes data associated with the scrubbed electronic documents, and
wherein the processor is further configured to replace the boundary data with the updated boundary data.

14. The system of claim 13 wherein the processor is further configured to perform the machine learning under direction of an associated user.

15. The system of claim 13 wherein the network interface further receives device operation data corresponding to operation of each of the multifunction peripherals and wherein the processor is further configured to perform the machine learning on received device operation data.

16. The system of claim 15 wherein the device operation data includes one or more of copy count, device usage rates, or identities of users associated with the document processing jobs.

\* \* \* \* \*